Figure 1:
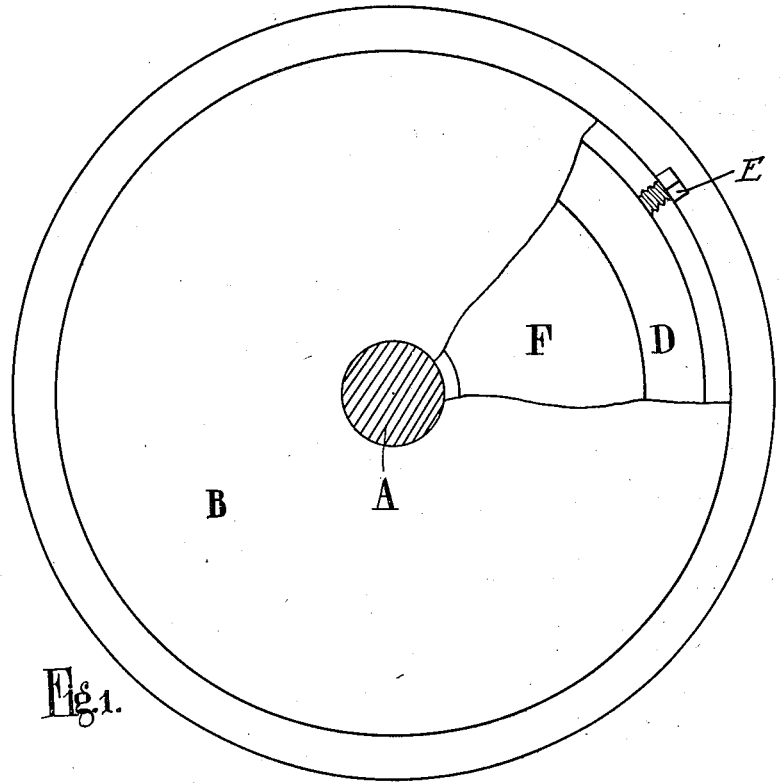

F. W. LANCHESTER.
ELIMINATING TORSIONAL VIBRATIONS IN HIGH SPEED ENGINES, &c.
APPLICATION FILED FEB. 4, 1920.

1,346,755. Patented July 13, 1920.

Inventor
F. W. Lanchester
By H. R. Kerslake
Attorney

UNITED STATES PATENT OFFICE.

FREDERICK WILLIAM LANCHESTER, OF LONDON, ENGLAND.

ELIMINATING TORSIONAL VIBRATIONS IN HIGH-SPEED ENGINES, &c.

1,346,755.  Specification of Letters Patent.  Patented July 13, 1920.

Application filed February 4, 1920. Serial No. 356,360.

*To all whom it may concern:*

Be it known that I, FREDERICK WILLIAM LANCHESTER, a subject of the King of Great Britain and Ireland, and residing at London, W. C. 1, England, have invented certain new and useful Improvements in Eliminating Torsional Vibrations in High-Speed Engines, &c, of which the following is a specification.

The present invention relates to improvements in means and mechanism for the elimination of torsional vibrations in high speed engines, shafting, crank-shafts and the like.

The present invention consists in brief in the employment of a considerable mass of viscid fluid contained within a drum or hollow wheel keyed to the rotating shaft, the said drum being furnished with adequate internal surface for the purpose of damping torsional vibrations and for preventing vibrations from being set up.

In one mode of carrying the present invention into effect as applied to the crank-shaft of a high speed engine I construct a hollow wheel or drum of relatively large diameter adapted to be keyed securely to the crankshaft at the opposite end to the fly wheel or at other convenient or suitable point. The rim of the wheel or drum is built to include a number of disks of thin sheet metal, the said disks being separated by narrow spaces conveniently of about $\tfrac{1}{16}$ inch more or less. In large apparatus the space may be greater. The drum is completed by a cover which incloses the internal space hermetically and at some convenient point near the boss a plug is provided for the injection of the viscid compound. For loading the drum a viscid oil may be used but this has the disadvantage of requiring a very great volume. It is advantageous to load the oil with a heavy metal or compound in small particles such as lead shot or in a state of fine division, such as for example metallic lead, white lead, red lead, galena or heavy-spar. It is of course important that the loading material chosen shall be without chemical action on the oil or other liquid with which it is admixed or on the metal of which the drum is composed. The effective viscosity of the loaded oil requires to be adapted to the width of gill-space adopted in the design; this in every case is a matter that is best settled by experiment, a number of oil compounds of different consistency being prepared and introduced successively into the drum, that which is found to give the best result being selected and its composition standardized for the particular service. If it be required to use an oil compound of lower viscosity the thickness of gill interspace may be appropriately reduced.

In applying the present invention to high speed engines in which no fly wheel is employed, damping drums may be conveniently fitted to both ends of the crankshaft, and, in the case of a long line of shafting carrying more than one motor or electric generator or other combination of rotating masses, the best points to apply the damper may be selected by theoretical investigation, the possible forms of vibration being examined and the damping positions being fixed at or near the "loops," that is to say, at points as distant as possible from the nodes.

The action of the hereinbefore described apparatus is analogous to that of the vibration damper described in British specification No. 21,139 of 1910 already granted to the present applicant. So long as the rotational movement of the shaft at the point where it carries the damper drum is uniform the drum with its contents rotates without offering resistance and without any material absorption of energy, but if any torsional vibration be set up as superposed on a uniform rotation the interior semi-fluid contents is sluggish in taking up the vibration or irregularity of motion and consequently exerts a damping influence. By appropriately varying the internal surface of the drum and the mass and effective viscosity of the contents any desired degree of damping may be obtained and the state known to physicists as the "dead beat" condition may be reached or approximated. Under this condition the disturbing torsional irregularities which normally are capable of setting up synchronous vibrations of dangerous amplitude become quite harmless.

Referring to the accompanying sheet of illustrative drawings:

Figure 1 represents by way of example in elevation, and

Figure 2:
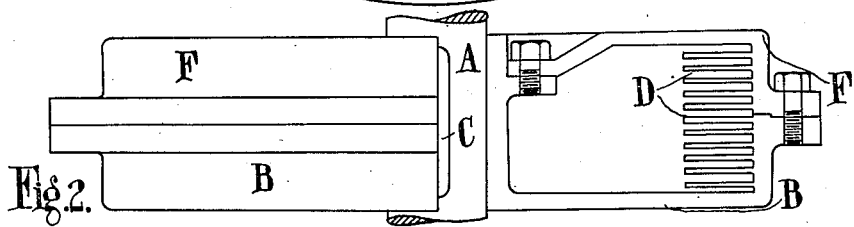

Fig. 2 in part section, a torsional vibration damper constructed in accordance with the present invention.

Figure 3:
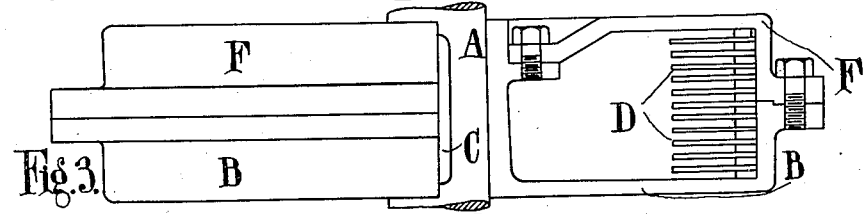
Figure 4:
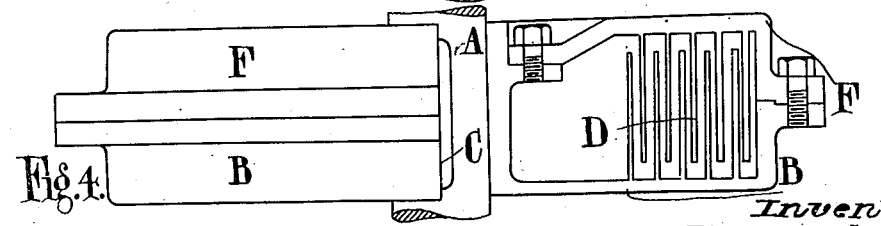

Figs. 3 and 4 give also in part section, alternative constructions.

Referring to the figures, in which like letters refer to like parts, A is the shaft, in some cases the crankshaft, subject to torsional vibration to which the invention is applied. B is a hollow drum keyed to the shaft or spindle A by the key C. The drum B is furnished with a cover F and has its internal surface appropriately augmented by internal gills as shown at D, these gills running circumferentially. The drum is filled or partially filled with a viscid compound as previously specified, not indicated in the drawing, a plug such as E being provided for the purpose.

The gills DD may be formed or separate disks of sheet metal fitted to the drum and appropriately clamped (Fig. 2) or may be formed by turning deep grooves in the drum and cover as in Fig. 1. An alternative construction is shown in Fig. 4 in which the augmented surface is given by forming deep grooves in the body of the drum B and the cover F leaving cylindrical projections adapted to intermesh with a small clearance space.

Having now described my invention, what I claim as new and desire to secure by Letters Patent is:—

A torsional vibration damper for high speed engines and the like comprising a hollow drum containing a fluid of high viscosity and appropriate density, a plurality of annular ring-like elements arranged circumferentially within the drum and in proximity to the interior surface of the peripheral portion thereof, means for spacing the elements and means for clamping the elements in spaced relation so as to in consequnece provide a series of circumferential grooves within the drum and thereby establish an adequate surface of contact with the fluid.

In testimony whereof I have signed my name to this specification.

FREDERICK WILLIAM LANCHESTER.